Sept. 18, 1951  C. A. WIKEN  2,567,982
MACHINE TOOL
Filed April 13, 1945  4 Sheets-Sheet 1

INVENTOR.
CHRISTY A. WIKEN
BY
*Strauch & Hoffman*
*ATTORNEYS*

FIG. 5

INVENTOR.
CHRISTY A. WIKEN
BY
Strauch & Hoffman
ATTORNEYS

Sept. 18, 1951 C. A. WIKEN 2,567,982
MACHINE TOOL
Filed April 13, 1945 4 Sheets-Sheet 3

INVENTOR.
CHRISTY A. WIKEN
BY Strauch & Hoffman
ATTORNEYS

Sept. 18, 1951     C. A. WIKEN     2,567,982

MACHINE TOOL

Filed April 13, 1945     4 Sheets-Sheet 4

*INVENTOR.*
CHRISTY A. WIKEN
BY *Strauch & Hoffman*
      *ATTORNEYS*

Patented Sept. 18, 1951

2,567,982

UNITED STATES PATENT OFFICE 2,567,982

MACHINE TOOL

Christy A. Wiken, Milwaukee, Wis., assignor, by mesne assignments, to Rockwell Manufacturing Company, Pittsburgh, Pa., a corporation of Pennsylvania Application April 13, 1945, Serial No. 588,081

3 Claims. (Cl. 77—5)

This invention relates to machine tools, in particular to a drill press operable at extremely high speeds.

It is frequently necessary to drill relatively small diameter holes of the order of ¼" down to .013" in work pieces of metal or the like. In view of the small diameter drills (No. 80), the light feed pressures and extremely high rotative speeds required to produce correct holes, obtain maximum tool life, reduce drilling time and save costs in quantity production, it is advantageous to provide an extremely high speed drill press (about 8,000 to 20,000 R. P. M.). Drill presses, utilizing the high rotative speeds at which these small drills must be used, have heretofore been offered to the trade but have been extremely expensive. An inexpensive drill press adapted to be driven at such high speeds and which would not break or injure the drills, due to vibration or by subjecting them to forces or shocks etc., such as that resulting from back lash in the quill pinion and the drill breaking through the work upon completion of the holes, has never been offered to the trade and was deemed impractical because it was felt such a drill press could not be built.

Prior attempts to solve these problems by the careful accurate machining of the parts of the press so as to reduce vibration, etc., have resulted in the drill press being relatively expensive to manufacture and unsuited for quantity production methods necessary to meet the unparalleled demand resulting from the rapid industrial expansion with unskilled labor brought about by the war.

The present invention provides a drill press which is particularly adaptable to high speed operation and which at the same time can be manufactured by quantity production methods with unskilled labor and inexpensively. The press incorporates several improvements including a novel sensitive feed and return mechanism and a novel semi-floating, drive coupling between a belt driven upper or pulley spindle and a lower or chuck spindle which carries the drill chuck. The coupling transmits torque from the pulley to the chuck spindle while permitting relative axial feed movement of the two spindles. The lower or chuck spindle is mounted in bearings in a quill adapted for axial movement, being moved by a quill pinion having an operating handle. Play and backlash in the complete drill press assembly are eliminated by the use of preloaded bearings and by a return spring arrangement which keeps the pinion in constant engagement with the same side of mating rack teeth on the quill. The machine operates satisfactorily at speeds even exceeding 12,000 revolutions per minute.

Accordingly, it is the primary object of this invention to provide an improved drill press adapted to be driven at extremely high speeds.

It is another important object of this invention to provide an improved drill press which will accommodate small drills and drive them at extremely high speeds without breaking them as they operate on a work piece.

Another object of this invention is to provide a drill press having a semi-floating drive between a fixed driving or pulley spindle and an axially movable tool holding or chuck spindle.

A further object of this invention is to provide a high speed drill press with a novel highly sensitive, positive feed mechanism.

It is another object of this invention to provide a drill press wherein backlash between the quill and pinion, and bearing play are eliminated.

Another object is the provision in a drill press of a novel return spring connection to the quill, wherein the spring acts directly on the quill with a force in alignment with its movement.

It is another object to provide a novel quill locking means wherein a sleeve or plug is jammed against the side of the quill to hold it in place.

Another object is the provision of an improved and simple means to adjust the tension or compression in a spiral spring.

Another object is the provision of means for adjustably positioning the handle on the quill pinion shaft of a drill press.

It is another object to provide an improved drill press base or pedestal having a peripheral coolant trough the lip of which, in conjunction with the upper surface of the base, serves as a work and drill press supporting surface.

A further object of the present invention is to provide a sectional drill press base or pedestal, including integral, peripherally disposed coolant trough sections the lips of which provide extensions of the working or supporting surface, adapted for assembly with similar bases and mating detachable, peripheral coolant trough sections to provide multiple spindle bases having a maximum working and supporting area.

Another object is the provision of a novel high speed relatively inexpensive machine tool which will operate without vibration.

Other objects will be apparent as the description proceeds in connection with the drawings wherein.

Figures 1, 2:
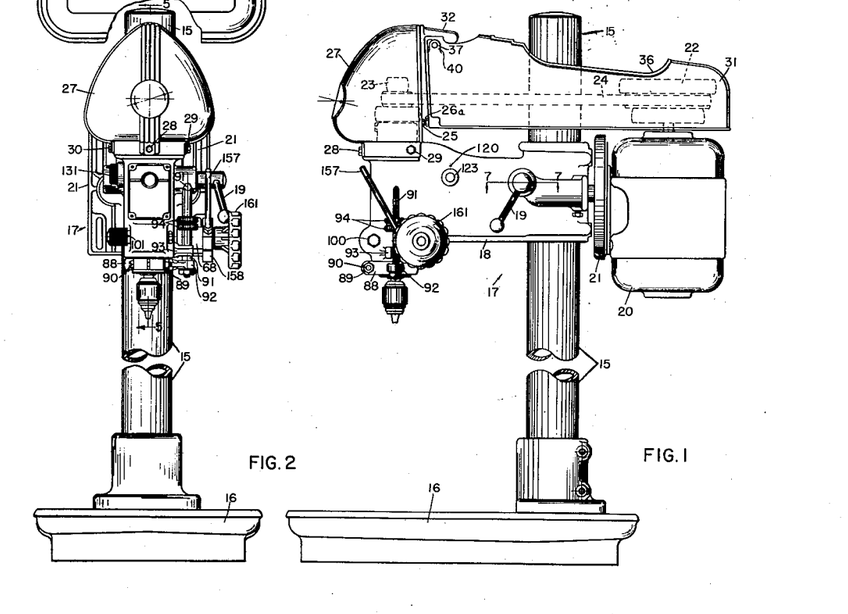
Figure 1 is a side elevation view of a drill press embodying the invention.
Figure 2 is a front elevation of the press shown in Figure 1.
Figures 3, 4:
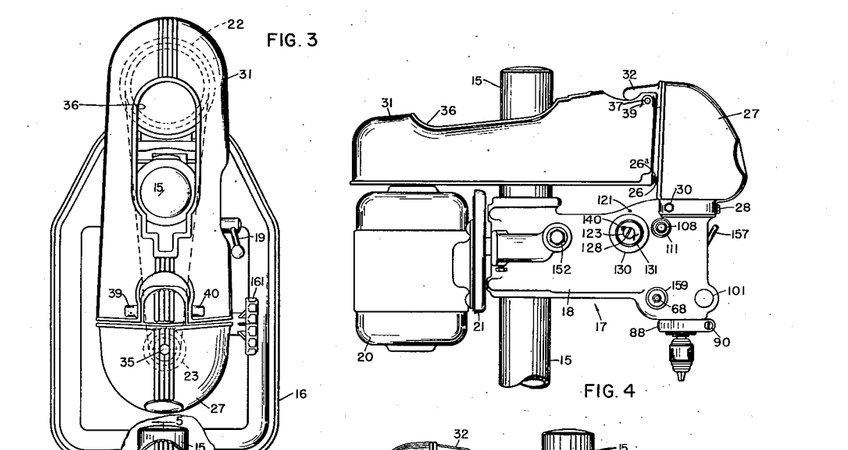
Figure 3 is a top plan view of the press of Figures 1 and 2.
Figure 4 is a side elevation of the press shown in Figure 1, but showing the opposite side of that of Figure 1.
Figure 16:
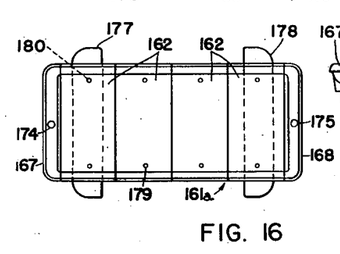
Figure 16 is a top plan view of an arrangement wherein several of the units of Figure 13 are fastened together.
Figure 17:
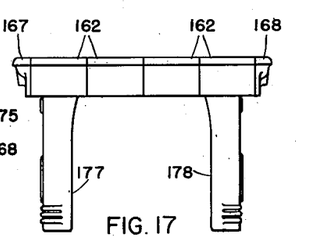
Figure 17 is a front elevational view of the multi-unit table arrangement of Figure 16.

As shown in Figure 1, the drill press includes a vertical preferably hollow cylindrical column 15 mounted on a base or pedestal 16 of either the floor supported or table supported type in any suitable or well known manner. Base 16 comprises a novel one-piece construction as shown in Figures 1 to 3 when a bench supported single spindle unit is desired or the novel sectional form of Figures 13 to 16 when a bench supported multi-spindle or floor supported assembly like that of Figure 16 is desired. In either case, the main body section of the base is provided with a peripheral coolant trough the lip of which is in the plane of the work surface as described in detail in connection with Figures 13 to 16. The head of the drill press is vertically adjustable and rotatable about the column 15 and is designated generally by the numeral 17. Head 17 includes a head frame or casting 18, to which are attached all of the parts of the head, clamped in any desired position to the column by means of tightening clamp handle 19 as will be explained, it being understood that the frame may be a casting as shown, or may be built in any desired manner.

An electric motor 20 is attached to a motor plate 21 which is carried by the head casting 18. A three step dynamically balanced motor pulley 22 is attached to the motor shaft and drives a novel dynamically balanced, lightweight, preferably aluminum, upper spindle pulley 23, which is similarly three step, and will be more fully described hereinafter, through a flexible belt 24. The belt drive is covered by a two-piece belt guard comprising a fixed guard 27 which is fastened to the top portion of the outboard end of the head casting, as by cap screws 28, 29 and 30 (Figures 1, 2, 4 and 5).

A rear or hinged belt guard 31 is pivotally attached to a lug 32 (Figures 1 and 5) which is fastened to the fixed guard 27 at the rear end thereof as by a bolt having fastening nut 33. A hinge pin 37 passing through the lug 32 and opposed parts 39 and 40 of the rear guard 31 which span the lug, provides the aforesaid pivotal attachment. Just forward of the lug 32 the fixed guard 27 has a vertical hole 35 which is in axial alignment with the spindle pulley 23 for a purpose to be described.

Figure 5:
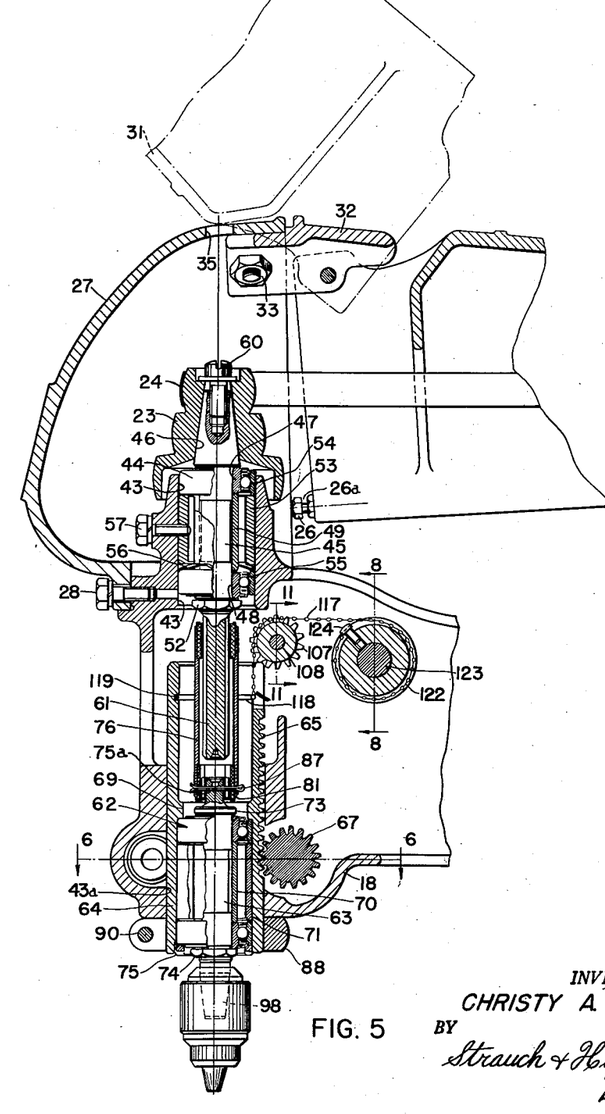
Figure 5 is an enlarged view, partly in section substantially along the line 5—5 of Figure 2 and looking in the direction of the arrows.

The rear or hinged guard has an opening 36 (Figure 3) in its top portion to permit passage of the column 15, and the aforesaid opening is elongated so that its edges will clear the top of the column when the hinged guard is swung up into the dotted position shown in Figure 5 as when the belt 24 is changed to change the drill speed. Set screws 25 and 26, having their heads protruding forwardly from the bottom parts of the skirt of the hinged guard 31, engage part of the fixed guard as shown in Figure 5, to form a stop for and limit the downward movement of the hinged guard so that it normally rests in a substantially horizontal position. The set screws may be screwed inwardly or outwardly to adjust the position of the hinged guard, and lock nuts to fix the set screws in adjusted position are shown at 26a.

The outboard end of the head casting has a vertical bore 43 at its top which receives an upper ball bearing or pulley spindle assembly 44. Assembly 44 comprises an upper or pulley spindle 45 which is tapered at 46 on its upper end to receive the upper spindle pulley 23. Taper 46 is finish ground with spindle 45 assembled and mounted in bearing assembly 44 to assure concentricity of the taper and avoid vibration. Below the taper 46 the spindle is reduced to provide a shoulder against which abuts an inner race 47 of an upper combined radial and thrust ball bearing. The inner race 48, of a lower combined radial and thrust ball bearing, is separated from the race 47 by an inner spacer sleeve 49, and the two inner races and spacer sleeve 49 are securely clamped together and against the aforesaid shoulder by means of a nut 52 threaded on the upper spindle 45 into engagement with inner race 48. An outer spacer sleeve 53 surrounds the inner sleeve 49 but is annularly spaced therefrom and engages the bottom of the outer race 54 of the upper ball bearing. The lower end of outer spacer 53 does not engage the top of the outer race 55 of the lower ball bearing but is slightly spaced therefrom. A spring washer 56 engages the bottom of spacer sleeve 53 and the top of the outer race 55 and is compressed therebetween when the bearing assembly is clamped together by the nut 52. The spring washer thereby preloads the bearings in the upper and lower ball bearings by urging their outer races apart while the bearings are clamped in spaced relationship along spindle 45.

This type of assembly, using a spring washer, permits the construction of a preloaded bearing assembly which, due to the wider manufacturing tolerances permissible, is substantially as effective but cheaper to manufacture than that shown in Figure 5 in the lower or chuck ball bearing spindle assembly wherein the inner and outer spacer sleeves must be finished to close tolerances in their respective lengths so that the bearings will be properly preloaded when the assembly is clamped together.

As shown in Figure 5, the upper or pulley spindle assembly 44 is located and fixed within the vertical bore 43 by means of a machine screw 57 passing through a hole in the head casting 18 and threaded into the outer spacer sleeve 53, but not engaging the inner spacer sleeve 49 which rotates with the upper spindle 45 and the inner bearing races. The assembly 44 can be removed as a unit when the screw 57 is removed.

The dynamically balanced stepped pulley 23 which has an internal tapered bore to fit the taper 46 on the top of the spindle 45, is seated on the spindle and clamped thereto by means of an axially centered machine screw 60 which is tapped into the top of the spindle. This construction eliminates vibration which would occur at high pulley speeds if a set screw passing radially through the pulley were used. The screw 60 is provided with a screw driver slot or the like which is accessible by a tool inserted through the hole 35 in the top of the fixed guard 27. As a consequence, pulley 23 may be removed with guard 27 in place and guard 31 in the dotted line position of Figure 5 since sufficient head room for this purpose is provided between the upper end of assembly 44 and guard 27.

The upper spindle 45 below the nut 52 terminates in an elongated downwardly extending splined portion 61 having external splines or teeth extending substantially its full length and paralleling the axis of the spindle.

A lower ball bearing or chuck spindle assembly 62, which rotatably mounts a chuck spindle 63, is fixedly mounted in vertical position within a hollow cylindrical quill 64 which is vertically reciprocable within an uninterrupted annular bore 43a in head casting 18. Bore 43a is substantially axially aligned with bore 43 and quill 64 has rack teeth 65 along its outer rear wall which engage a quill pinion 67 on a quill pinion shaft 68. The axis of shaft 68 is horizontal and normal to the axis of bores 43 and 43a and the quill is raised or lowered by rotating the shaft 68 as will be understood.

There is an internal shoulder 69 within the quill, forming an upper stop or locating means for the assembly 62 which contains the lower spindle 63. The lower assembly 62 is similar to the preloaded upper assembly 44 except that spring washer 56 is not used to preload the bearings. Instead, the inner and outer spacer sleeves 70 and 71 are carefully selected as to length so that when the assembly is tightened against upper shoulder 73 on the spindle 63 by means of the nut 74, the assembly is completely sealed and adjusted in predetermined preloaded condition. The entire assembly 62 is fixed in quill 64 by means of suitable retaining means, such as a collar 75 which engages the outer bearing race of the lower bearing and has threaded engagement with the inner end of the quill, thus forcing the assembly against the shoulder 69 as the collar 75 is tightened.

When the quill is in its uppermost position the top of the chuck spindle 63 is just below the end of the long splined portion 61 of the pulley spindle 45. The top end portion of the chuck spindle 63 has external splines which may be similar or identical to the splines or teeth on the pulley spindle 61. However, the splined portion of the chuck spindle is comparatively short, as shown in Figure 5 and is provided with a transverse passage 75a for a purpose to be presently pointed out.

Figures 6, 7, 8, 9, 10, 11, 12, 18:
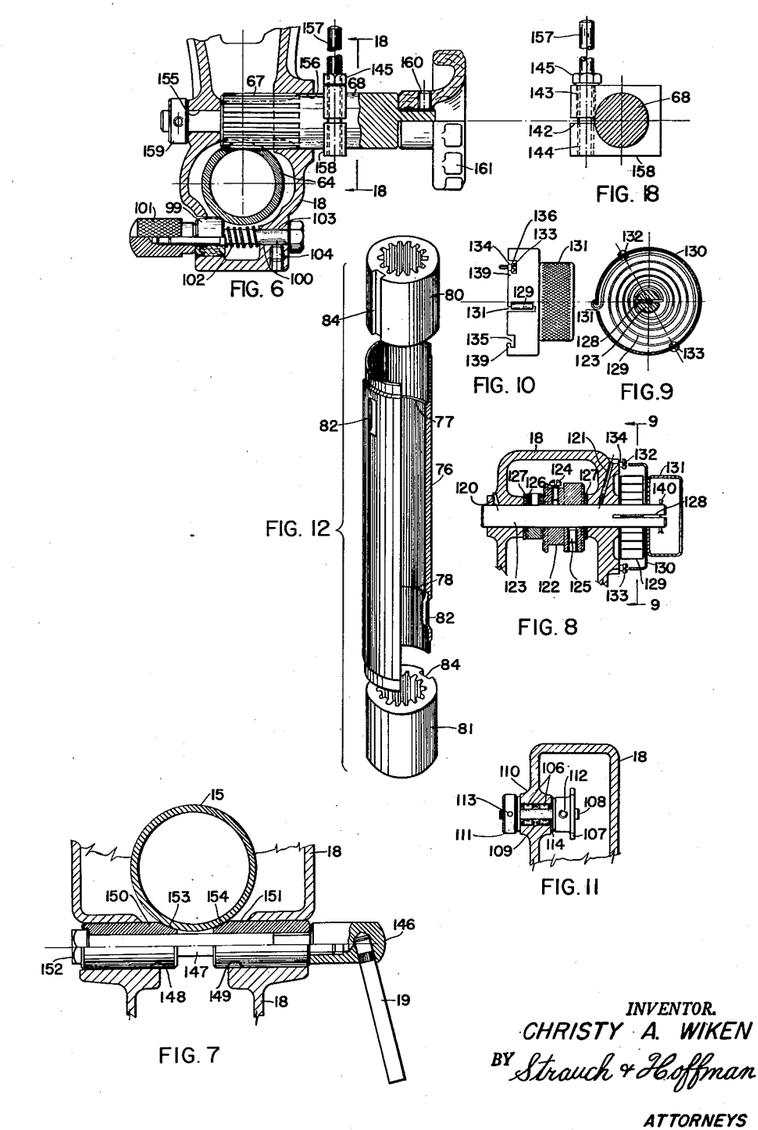
Figure 6 is a view partly in section, taken substantially along the line 6—6 of Figure 5 and looking in the direction of the arrows, showing details of the quill, and the feed and clamp or lock therefor.
Figure 7 is a view partly in section, taken substantially along the line 7—7 of Figure 1 and looking in the direction of the arrows, showing details of the clamp which holds the head on the column.
Figure 8 is a view partly in section, taken substantially along the line 8—8 of Figure 5 and looking in the direction of the arrows, showing details of the adjustable return spring and take-up reel for the quill.
Figure 9 is a view partially in section taken substantially along the line 9—9 of Figure 8, looking in the direction of the arrows.
Figure 10 is an edge view of the adjustable cover used to tension the return spring for the quill showing how its bayonet type slots engage the screws which hold it in place.
Figure 11 is a partial sectional view, substantially along the line 11—11 of Figure 5 and looking in the direction of the arrows, showing details of the elevating chain idler pulley.
Figure 12 is an exploded view in perspective showing details of the semi-floating drive tube.
Figure 18 is a sectional view along the line 18—18 of Figure 6 and looking in the direction of the arrows.

Chuck spindle 63 is connected to the pulley spindle for rotation therewith by means of a semi-floating drive tube shown in exploded perspective in Figure 12.

The drive tube comprises a thin-walled lightweight cylindrical tube 76, preferably of aluminum, counterbored at each end to provide internal shoulders 77 and 78. Inserts 80 and 81 of hard fiber material, preferably "Spauldite" Grade C. E. F., having internal splines are suitably fixed in the counterbores in the drive tube, their inner ends being seated against the shoulders 77 and 78. The ends of the tube 76 may be peened over the outer ends of the fiber inserts to hold the inserts within the tube. These inserts are held against rotation relative to the tube by means of depressed tangs 82, one formed at each end on diametrically opposite sides of the tube to assure dynamic balance of the tube, in the tube which engage diametrically opposed longitudinal slots 84, one in the outer surface of each insert. This means is adopted to avoid the use of separate locking members which, probably being of unequal weight or at varying distances from the axis of rotation, would cause vibration in operation.

While the semi-floating drive tube of Figure 12 and pulley 23 might be made in suitable dimensions and weight so long as dynamic balance of spindle 44 and 63 in operation is assured, it has been found that the suitable operation of a fourteen inch drill press, like that shown in the drawings, is obtained by employing the following manufacturing tolerances and procedure. This consists in utilizing a carefully symmetrically balanced aluminum pulley 23 with a tapered bore and which has no radial openings or radially extending securing means to throw it out of balance. The pulley surfaces, furthermore, are individually finished with the pulley mounted on a screw machine fixture having an accurately ground taper identical to taper 46. To assure concentricity of the pulley surfaces, the tapered bore of pulley 23 is rough cast and then taper reamed to provide a perfect fit between the fixture and pulley. As a consequence of the method of finishing taper 46 and the pulley surfaces, true rotation of spindle 45 and its associated pulley 23 is assured.

The semi-floating tube is preferably manufactured with a three and nine-thirty-seconds inch overall length, a three-fourths inch outer diameter, a five-eighths inch inner diameter, a wall thickness of one-sixteenth inch and to an overall weight of one ounce in the drill press illustrated. With this specific construction, it has been found that even slight misalignment of the upper and lower spindle assemblies does not produce noticeable or objectionable vibration.

The internal splines of the inserts have a snug yet sliding fit with the splines on the pulley and chuck spindles. In order to keep the drive tube from sliding relative to the chuck spindle 63, means such as a cotter pin 87, having protruding ends of practically equal weight and radial projection, is passed through aligned holes in the tube 76, lower insert 81, and the passage 75a of chuck spindle 63 as shown in Figure 5. By this construction, as the quill 64 is raised or lowered by rotation of the pinion 67, the semi-floating drive tube moves up or down with it, the upper fiber insert 80 sliding upon the splines of the pulley spindle 45, yet transmitting positive driving torque to the chuck spindle 63 by means of the lower fiber insert 81 and splines upon the chuck spindle 63. The cotter pin 87 keeps the drive tube from being pulled off of the chuck spindle as the quill is lowered.

The semi-floating lightweight drive connection described above permits slight misalignment of the upper and lower drive spindles without causing run-out of the lower spindle and eliminates vibration even with slight misalignment of the pulley and chuck spindle assemblies even at speeds in excess of 12,000 revolutions per minute, at which speeds the elimination of vibration is a difficult problem.

The upward movement of the quill is limited by a split ring type stop collar 88 which is clamped to the bottom of the quill by a clamping nut 89 and bolt 90. A threaded stop rod 91 carried by a projecting lug 92 extends vertically upwards through a bore or slot in a lug 93 on the head casting (Figures 1 and 2), there being a pair of stop nuts 94 threaded on and positionable along the rod to limit the downward movement of the quill when they engage the lug 93.

The lower end of the chuck spindle 63 terminates in a taper 98 which accommodates a "Jacobs" drill chuck in a conventional manner. Taper 98 is finish ground with spindle 63 assembled and mounted in bearing assembly 62 to assure concentricity of taper 98 and the minimum run-out of the "Jacobs" chuck.

In order to clamp the quill 64 against movement when desired, a fiber clamp sleeve or plug 99 on a bolt 100 (Figure 6), passing through a bore 103 in the head casting 18, is pressed against the outer surface of the quill by tightening a knurled nut 101 against the fiber sleeve. A coiled compression spring 102 on the bolt 100 forces the clamp sleeve away from the surface of the quill when the nut 101 is loosened. The bolt 100 is held fixed against sliding or rotating movement in the bore 103 by means of a set screw 104 threaded into the head casting radially towards the bolt. By means of this construction the conventional split in the head casting to allow it to be clamped to the quill to hold the quill against movement is avoided. This is advantageous since the same head casting holds the bearing for the pulley spindle 45 and the slight distortion of the head casting necessary to clamp the quill, which also might tend to misalign the upper spindle and bearings, is eliminated.

To eliminate all play and back lash in the feed mechanism and assure positive movement of the quill 64 in both directions at all times, the present invention provides a novel retracting mechanism. As best shown in Figures 5 and 11, the retracting mechanism comprises a guide sprocket 107 fixed to but axially adjustable along a horizontally rotatable shaft 108 journalled as by needle bearings 106 in a bore 109 passing through a boss 110 in a side wall of head casting 18, a collar 111 fixed to but axially adjustable along the outer end of shaft 108, which protrudes through to the outside of the head casting, a sprocket chain 117, and a spring loaded take-up reel 122. Sprocket 107 and collar 111 are axially adjustable on the shaft by loosening the set screws 112 and 113, respectively. Spacer washers 114 or the like in suitable number are placed on the shaft between the sprocket and the boss to properly locate the sprocket with relation to the axis of the quill.

The guide sprocket 107 is so located in the head casting that chain 117, which passes over the sprocket, hangs vertically downward, as shown in Figure 5, in a plane containing the axis of the quill and has its lower end attached to a snap ring 118 which is sprung outwardly and snugly seated in an annular groove 119 on the interior wall of the quill 64. The vertical portion of the chain is in substantial vertical alignment with the engaging rack teeth 65 and pinion 67 and the chain is constantly maintained under tension sufficient to raise the quill to its uppermost position in a manner to be described. This constant tension eliminates the effect of any back lash between the rack teeth and pinion because it keeps the upper side of the rack teeth constantly in contact with the lower side of the pinion teeth. Thus there is no lost motion between the quill and the pinion when the rotation of the pinion is reversed or stopped as when reversing or braking the feed or when the drill breaks through at bottom of stock which is the instant of drill breakage. The combination of the means eliminating the back lash and of the preloaded bearing assemblies results in a complete elimination of play in the driving and feeding assemblies. Consequently, the breakage of small diameter drills, when driven at the high speeds for which the drill press is designed, due to the final "break-through" in a work piece, play in the assemblies and the practically instantaneous changes in loads and forces during the "break-through," is substantially eliminated.

The tension in the chain 117 is maintained by a spring loaded take-up reel 122 (Figures 5 and 8 to 10) which is fixed to a rotatable shaft 123 journalled in the head casting 18. As shown in Figure 5, the chain passes horizontally rearward from the guide sprocket 107 to the take-up reel, to which it is fastened by a screw 124. The take-up reel is fastened to the shaft as by a set screw 125 and suitable spacer collars and washers 126 and 127 are assembled on the shaft to prevent axial movement of the shaft. Oil holes 120 and 121 in the head casting provide means for lubricating the shaft. One end of the shaft 123 projects a substantial distance beyond the outer wall of head casting 18 and has a diametrical slot 128 which receives the inner end of a flat spiral spring 129. The outer end of the spring 129 is fixed to the cylindrical wall of a cup-shaped cover 130 by any suitable means such as by hooking it into a slot 131 (Figure 9) in the wall. The base of the cover has a central hole through which the end of the shaft 123 protrudes so that the cover is journalled for rotation on the shaft. Spring 129 is so tensioned that it tends to rotate the take-up reel 122 in a clockwise direction as viewed in Figure 5. Tensioning of the spring is accomplished by rotating the cup-shaped cover 130 about the shaft by means of the knurled flange or hand portion 131. Hand grip 131 may be a separate piece fixed to the cup-shaped spring cover as by welding or formed as an integral part thereof.

The tension of the spring 129 is increased by rotating the cover 130 in a counterclockwise direction as viewed in Figure 9, and decreased by rotating the cover in the other direction. After adjusting the spring tension the cover is held fixed in position by means of a pair of machine screws 132 and 133 which have flat flanged heads which are spaced from the outer wall of the head casting as by shoulders 134 which are smaller in diameter than the flanged heads of the screws. The cover 130 has a series of bayonet slots 135, 136, etc., which obviates any pressure on the sides of the cover that might impose a drag on the spring 129, (Figure 10) which are located in the cylindrical wall at the open end of the cover. These slots allow the cup to be slipped over the flanged heads of the screws 132 and 133 but have lips 139 which slip under the flanged heads and hold the cover against clockwise rotation as viewed in Figure 9. In Figure 9 there are shown a pair of diametrically spaced screws 132 and 133 which are engaged in a pair of diametrically opposed bayonet slots in the cover. The cover shown in Figure 10 has two pairs of diametrically opposed bayonet slots ninety degrees apart. Thus the cover can be shifted through angles of ninety degrees or multiples thereof by rotating it counterclockwise until the lips 139 disengage from the heads of the screws 132 and 133 and then pulling the cover away from the head casting 18. A cotter pin 140 or the like near the end of shaft 123 may be provided as a stop to prevent the cover being pulled too far from the head casting and off of the shaft.

After the cover has been pulled away from the head casting and from the screws as described above, it can be turned counterclockwise to increase the tension of the spiral spring or clockwise to decrease the tension as desired. Once the desired tension is obtained the cover is pushed back towards head casting 18 and the heads of the screws 132 and 133 slip into a pair of oppositely disposed slots in the cover. The cover is then turned slightly clockwise to engage the lips 139 under the heads of the screws and the cover will be fixed in the desired position.

As shown in Figure 7, the head casting 18 has a pair of axially aligned horizontal bores 148 and 149 adjacent the column 15. A hollow cylindrical sleeve 150 has an accurate and sliding fit in the bore 148 and a similar sleeve 151 is similarly fitted in the bore 149. The location of the horizontal bores with relation to the outer surface of the column 15 is such that when the sleeves 150 and 151 are pushed towards each other they engage the column between them. A bolt 147 having a head 152 passes through the sleeves and has a nut 146 threaded on its free end, the clamp handle 19 protruding substantially radially from the nut. The sleeves 150 and 151 are slightly flattened at 153 and 154 where they respectively engage the column 15 to give a larger bearing surface thereagainst and to hold the sleeves against rotation in their bores when the nut 146 is turned. The head 152 of the bolt is seated in a mating recess in the outer end of the sleeve 150, being thus locked against rotation with respect to the sleeve. Thus, when the clamp handle 19 is rotated to tighten the nut 146 on the bolt, the sleeves 150 and 151 are clamped against the column and the head casting 18 is locked in desired position along the column. This construction enables the clamping of the head casting to the column without splitting the casting in the conventional manner. The sleeves 150 and 151 are preferably of a soft metal or other material such as fiber where they engage the column, so that they will not mar it.

As best shown in Figure 6 the pinion shaft 68, which carries the quill pinion 67, is journalled in coaxial horizontal bores 155 and 156, and is held in position by set collar 159, as will be apparent. In order to provide a feed control with a slight touch, the outer end of the shaft 68 is reduced in diameter, and affixed thereto by a set screw 160 is a turning knob 161 with which a small or light turning moment can be applied to the shaft. Due to the constantly maintained positive engagement of pinion 67 and rack teeth 65, an operator, by use of knob 161, can actually feel the cutting action of even small drills, such as a No. 80 drill, and impart the desired feed pressure even to the lightest pressure capable of producing a cutting action.

A handle 157 to give a larger leverage is adjustably fastened to the pinion shaft 68 between the knob 161 and the head casting 18. A block 158 having a bore to accommodate shaft 68 has a radial slot 142 therethrough permitting the handle to be used to clamp the block to the shaft 68. The handle 157 has a sliding fit through one bore 143 in the block 158 but has threaded engagement with an aligned bore 144 on the other side of the slot 142. A nut 145 is threaded on the handle and when tightened clamps the block and handle securely to the shaft 68. Thus the handle can be adjusted through three hundred sixty degrees about the shaft so that it is in the most convenient position for use by the operator. This is highly advantageous because with different drilling operations the movement of the quill is generally different and jigs or fixtures for holding the work may be in the way of unimpeded movement of the handle.

The novel built-up base or pedestal 161 shown in Figures 13 to 16 is more advantageously used with the head when the entire unit is to be mounted on a table or bench or when the heads are to be used in gangs, side by side. The built-up base comprises a main body 162 which is flat on top, there being an integral coolant trough 163 at the front and a similar coolant trough 164 at the rear. The body 162 is rectangular in plan and its two sides 165 and 166 are vertical, being finished for mating engagement with a pair of side coolant troughs 167 and 168.

Figure 13:
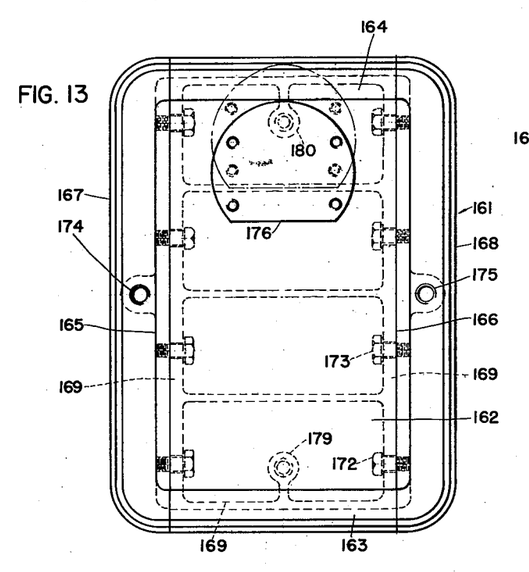
Figure 13 is a top plan view of an assembled built-up base or pedestal.
Figure 14:
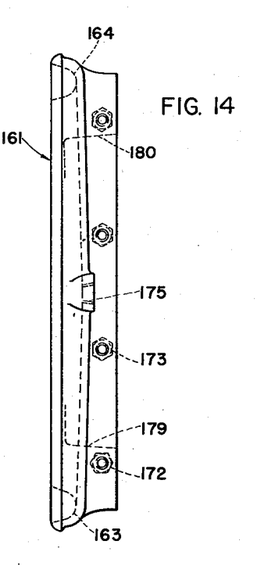
Figure 14 is a side view of the base of Figure 13.
Figure 15:
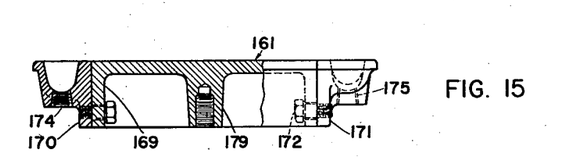
Figure 15 is a front elevation of the base of Figure 13 with portions in section to illustrate structural details.

The bottom of the body 162 is recessed to lighten it and to provide a peripheral downwardly extending web 169. The side troughs 167 and 168, which are identical and may be interchanged, have downwardly extending webs 170 and 171, respectively, which bear against the sides of the web 169, there being bolts 172, 173, etc. passing freely through slightly enlarged openings in the webs 169, and engaging threaded mating holes in webs 170 and 171 to fasten the side coolant troughs to the body 162. As shown in Figure 13, the ends of the side troughs are curved through a ninety degree angle so that when assembled to the body a continuous coolant trough is provided. The mating faces of the body 162 and the side troughs 167 and 168 are machined or finished so that they will fit flush when bolted together in assembled relationship, although a thin gasket may be used between the mating faces to assure against leakage of coolant therebetween. The slightly enlarged openings in web 169 are sufficiently larger than the diameter of the bolts 172, 173, etc. to provide vertical and longitudinal adjustment of the side troughs relative to the main body 162 before the bolts are tightened. While the bottoms of the coolant troughs 163 and 164 are level, those of the side troughs slope toward their center where drains 174 and 175, respectively, are provided, as shown in Figures 13 and 14. The top edges of the coolant troughs both on the main body and on the side troughs are in the plane of the top surface of the main body, thus providing what is in effect an extension of the working and supporting surface provided by the main body. These upper edges on the troughs are ground at the same time as the surface of the body itself to assure the desired planar relationship. As will be appreciated, since all of the upper edges of the troughs are in the same plane as the top surface of the main body, a work piece or holder therefor can rest upon the upper edge of the trough as well as on the main body, and will be supported just as well as if the main body were larger in dimensions. This novel construction wherein the upper edges of the cooling troughs are in the same plane as the top of the main body is also shown in Figure 2, wherein the base or pedestal 16 is in one piece with all of the coolant troughs integral with the main body.

Another advantage is that the collar mounting flange 176 may be moved back from its normal position shown in full lines in Figure 13 to the position shown in dotted lines, merely by boring additional vertical mounting holes (shown in dotted lines) in the main body to receive the bolts which fasten the mounting flange to the body. When moved back to this position the rear part of the flange rests upon the top of the outer lip of the integral coolant trough 164 where it is given adequate support. This gives a substantially greater working surface under the drill without increasing the overall dimensions of the base.

An advantage in making the side troughs 167 and 168 detachable is that it is often desirable for production purposes to mount a series of the drill presses side by side. When this is desired the side troughs are detached and as many of the main body portions as are necessary, one for each drill press, are bolted together at their mating flanges 169 on their sides, suitable bolt and nut assemblies being used for this purpose. When thus assembled the side troughs are bolted, as previously described, to the sides of the outermost main bodies, as shown in Figure 16 to provide a multi-spindle base 161a.

When such a multi-spindle base is used it is advantageous to support it on suitable legs 177 and 178 bolted to threaded bosses 179 and 180 (Figures 13 to 17) on the underside of the body sections 162.

The complete assembly provides an improved drill press which operates without vibration even at extremely high speeds, but which can be produced at a relatively low cost compared to those of heavy intricate design which are extremely carefully machined in an effort to secure the balance required for high speed, vibrationless operation. The breakage of small drills is reduced to an insignificant figure with this drill press. This result is attained due to the lightweight drive members, elimination of backlash between the quill and quill feed pinion, the use of preloaded bearings by which all play is eliminated and the carefully balanced and finished lightweight drive pulley, whereby small drills do not fraction even when they "breakthrough" a work piece at the end of a drilling operation. By means of the novel device for locking or clamping the quill in any axial position, the drill press can be used for shaping or routing wood etc. by the substitution of proper tools for the drills without possible injury to the lightweight drive members. In view of its high speed, grinder tools, including small rubber wheels can be attached for grinding operations. When so used, the Bakelite or fiber clamp sleeve or plug 99 avoids marring the quill surface.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by the United States Letters Patent is:

1. In a drill press, a frame; a pulley spindle journalled solely in said frame for rotation; a hollow quill mounted in said frame for axial sliding movement with respect to said pulley spindle; means holding said quill against rotation; a chuck spindle having axially spaced bearing means adjacent its ends journalling it for rotation in said quill in axial spaced alignment with said pulley spindle; means for rotating said pulley spindle at high speed; means for moving said quill axially within said frame; and a semi-floating lightweight drive member connecting the adjacent ends of said spindles to drive said second spindle from said first spindle irrespective of their axial spacing, said member having an axial sliding engagement with said pulley spindle and a floating driving connection with said chuck spindle.

2. In a machine tool, a frame, a driving spindle journalled solely in said frame for rotation; means for rotating said driving spindle at high speed; a driven spindle having axially spaced bearing means journalling it for rotation in said frame in axial alignment with but axially spaced from said driving spindle; means for moving said driven spindle axially with respect to said driving spindle; said driving spindle having an elongated externally splined portion extending toward said driven spindle for a distance at least equal to the axial shifting movement of said driven spindle; and a light-weight tube having internal splines at one end portion engaging the externally splined portions of said driving spindle, and a floating connection between said tube and said driven spindle for rotation and axial movement therewith.

3. In a machine tool, a frame; axially spaced, dynamically balanced driving and driven spindles mounted in said frame, the adjacent end portions of said spindles being provided with splines, and the opposite ends being tapered to respectively receive a drive pulley and a tool chuck; preloaded bearing means mounted in said frame for rotatably mounting said driving and driven spindles so as to eliminate axial or radial play during rotation of said spindles; a dynamically balanced internally tapered drive pulley mounted on the tapered end of said driving spindle; axially centered fastening means retaining said pulley on said driving spindle; a quill mounted in said frame for movement coaxially with respect to said spindle axes, the preloaded bearing means for said driven spindle being mounted in said quill; means engaging said quill and operable to move said quill away from said driving spindle; resilient means urging said quill towards said driving spindle with a force sufficient to prevent back-lash between said quill and said quill engaging means; the splined portion of said driving spindle being at least as long as the axial movement of said quill; a thin-walled light weight tube of negligible mass provided with splines at its ends, said splines engaging the splined portions of said spindles in all positions of said quill so as to drive said driven spindle from the driving spindle; and means securing said tube and said driven spindle together to prevent disengagement of the mating splines thereon.

CHRISTY A. WIKEN.

REFERENCES CITED

The following references are of record in the file of this patent:

UNITED STATES PATENTS

| Number | Name | Date |
|---|---|---|
| 397,701 | Dallett | Feb. 12, 1889 |
| 1,519,945 | Weingartner | Dec. 16, 1924 |
| 1,577,975 | Klausmeyer | Mar. 23, 1926 |
| 1,682,558 | Doan | Aug. 28, 1928 |
| 2,154,745 | Hedgpeth | Apr. 18, 1939 |
| 2,202,878 | Tautz | June 4, 1940 |
| 2,251,016 | Gallimore | July 29, 1941 |
| 2,329,601 | Frye | Sept. 14, 1943 |
| 2,349,929 | Atkins | May 30, 1944 |
| 2,360,921 | Wiken | Oct. 24, 1944 |
| 2,378,637 | Jackson | June 19, 1945 |

FOREIGN PATENTS

| Number | Country | Date |
|---|---|---|
| 212,896 | Switzerland | Mar. 17, 1941 |